Patented June 6, 1939

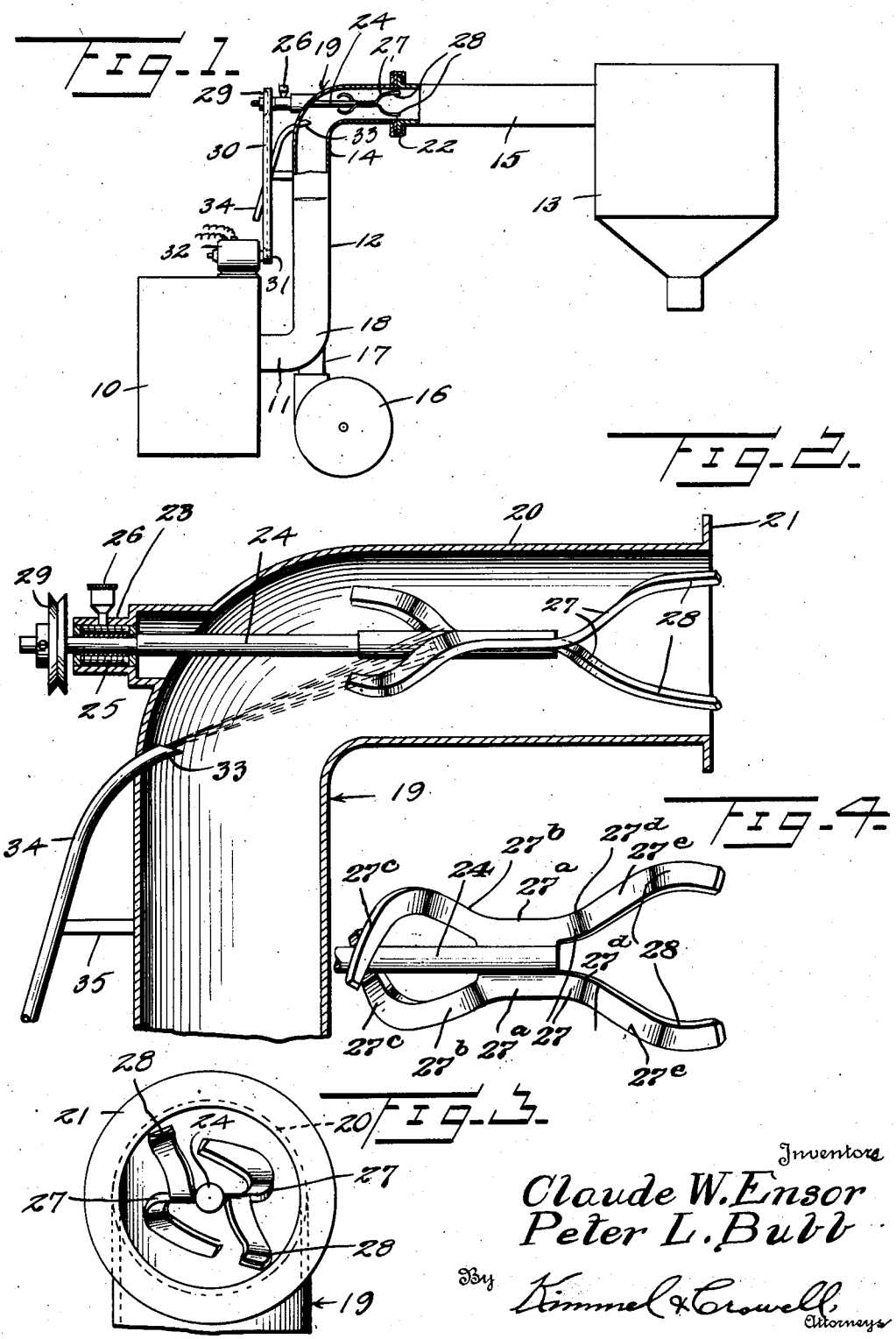

2,161,508

UNITED STATES PATENT OFFICE 2,161,508

MOLASSES FEED MIXER

Claude W. Ensor, Sparks, and Peter Lewis Bubb, Parkton, Md.

Application August 12, 1938, Serial No. 224,582

3 Claims. (Cl. 259—9)

This invention relates to feed mixing devices, and more particularly to a means for mixing fluid such as molasses or the like with ground feed.

An object of this invention is to provide an improved mixing means in combination with a feed grinder, blower and collector which is so constructed as to eliminate the objectionable features present in devices now available, wherein the feed packs within the connecting pipe between the blower and the collector.

Another object of this invention is to provide a device of this kind wherein the fluid being mixed with the feed is discharged in the same direction as the movement of the feed between the blower and the collector.

A further object of this invention is to provide as a new article of manufacture a mixing device which is adapted to be interposed in the pipe connecting the grinder, blower, and collector, so that in the event the mixed feed clogs up the pipe the material may be readily loosened without taking the blower or grinder apart as is the case with devices at present available.

A still further object of this invention is to provide a mixing device of this kind wherein the fluid, such as molasses or the like, is discharged directly against the rotatable mixing member so that the fluid will be whirled about by rotation of the mixing member.

In the drawing:

Figure 1 is a diagrammatical view of a grinding system including a grinder, blower, a collector, and a pipe connecting the several parts together wherein a device constructed according to this invention is interposed in the connecting pipe, Figure 2 is a vertical section of the mixing device, Figure 3 is a fragmentary front elevation of the device, and Figure 4 is a fragmentary detail side elevation of the rotatable mixing member.

Referring to the drawing, and first to Figure 1, the numeral 10 designates generally a grinder of conventional construction which is provided interiorly thereof with a conveying means to discharge the ground material therefrom, and the numeral 11 designates a nipple or pipe connection which is connected at one end to the outlet side of the grinder 10. This nipple 11 is connected to a vertically disposed pipe 12 which is provided with an elbow 14 connecting the pipe 11 with a horizontally disposed pipe 15 which is in turn connected to a collector or receiving member 13.

The material discharged from the grinder 11 is forced upwardly through the pipe 12 and the pipe 15 by means of a blower 16 which is connected to the pipe 12 at the junction between this pipe 12 and the nipple 11 as by means of a short nipple or pipe connection 17 which is connected to the elbow 18 between the pipe 12 and the nipple 11. This structure is conventional, and is here disclosed as one system with which the hereinafter described mixing means may be combined.

At present, the material being discharged from the grinder 11 is mixed with a fluid such as molasses or the like at a point adjacent the blower 16, so that the air pressure from the blower 16 will force th mixed material upwardly through the pipe 12 and then through the pipe 15 into the collector 13. Due to the inherent adhering quality of the fluid, the blower 16 is incapable of preventing the material from sticking to the pipe 12 or to the pipe 15, the usual point of clogging being at the junction between the pipe 12 and the pipe 15.

In order, therefore, to provide a means whereby the ground material may freely flow through the pipe 12 and the pipe 15 to the collector 13 irrespective of the air pressure, we have provided a mixing member including a right angular pipe or hollow body 19 which has the lower or vertical leg thereof secured to the upper end of the pipe 12. The upper or horizontal leg 20 of the body or pipe 19 is provided with a flange 21 about which a holding clamp 22 is adapted to engage for detachably securing the said upper leg 20 to the pipe 15. The lower end of the vertical portion of the pipe 19 may telescope into the upper end of the pipe 12 or be secured thereto in any suitable manner.

The said upper or horizontal leg 20 is provided with a bushing or box 23 in which a shaft 24 is journaled. The box 23 may include antifriction bearings 25 in the form of rollers or the like, and the bearing 23 may be lubricated by means of lubricating fitting 26.

The shaft 24 extends axially into the said upper or horizontal leg 20, and has fixedly secured thereto a pair of mixing blades 27. The blades 27 are of like construction, substantially of straplike form and oppositely disposed. Each blade includes a rectangular central part 27$^a$ having its lengthwise edge merging into the outer periphery of shaft 24. The forward end of part 27$^a$ is flush with the forward end of shaft 24. Each blade also includes a rear intermediate part 27$^b$ which extends rearwardly from and at an outward inclination with respect to the rear end of part 27ª, as well as being upon a curve disposed inwardly at the rear portion thereof; a rear end part 27ᶜ extending rearwardly from and directed inwardly from the rear end of part 27ᵇ, as well as being upon an inwardly directed curve throughout; a forwardly directed outwardly inclined extension 27ᵈ of less width than the width of the forward end of the part 27ª, as well as being integral with the latter; a forwardly directed outwardly inclined forward intermediate part 27ᵉ integral at its rear end with the forward end of the extension 27ᵈ, as well as being slightly curved from end to end; and a forwardly directed rear end part 28 of arcuate contour merging at its rear end into the forward end of part 27ᵉ. The rear intermediate parts 27ᵇ of the blades are spaced from the shaft 24. The rear end parts 27ᶜ of the blades overlap in spaced relation and extend beyond the shaft 24. The said parts 27ᶜ are so disposed substantially in spiral relation with respect to shaft 24. The extensions 27ᵈ, forward intermediate parts 27ᵉ and the forward end parts 28 of the blades are spaced from shaft 24. The central parts 27ª of the blades are integral with opposite sides of the periphery of shaft 24, are arranged in alignment with each other and also are radially disposed with respect to the axis of shaft 24. The blades 27 are of a length to extend from a point adjacent the axial center of the vertical portion or lower leg of pipe 19 forwardly to a point slightly beyond the flange 21 on the said upper leg 20. The construction of each blade 27 is such, that it includes a rear and a forward outwardly directed mixer. The said mixers are disposed in oppositely extended relation and spaced from each other. One mixer of each blade is formed from the parts 27ᵇ, 27ᶜ and its other by the extension 27ᵈ and the parts 27ᵉ, 28. The forwardly directed parts 28 of the blades 27 are disposed relatively close to the inner surface of the pipe section 20 so as to whirl the ground material co-active with the mixing of a fluid therewith as will be hereinafter described.

A pulley 29 is secured to the projecting end of the shaft 24 and this pulley 29 has a belt or flexible member 30 trained thereover which is also trained over a driving pulley 31 operated by means of a motor 32. If desired, the motor 32 may be the same motor which operates the grinder 10 or the blower 16 and is here shown as only one means by which the shaft 24 may be rotated.

A nozzle 33 is disposed in the upper portion of the vertical section of the lower leg of the L-shaped pipe 19 and is connected to a supply pipe 34 which has a portion thereof fixedly secured to the pipe 19 as by a bracing or holding member 35. In the present instance, the pipe 34 comprises a relatively short pipe section 34 which is fixed to the pipe member 19 so that a suitable supply pipe may be connected to the short pipe section 34 in order to discharge fluid under pressure from the nozzle 33. The nozzle 33 is disposed in substantially the same vertical plane as the axial center of the shaft 24 and is disposed in such a position as to direct the fluid upwardly on an angle against substantially at the rear end of the points of connection between the blades 27 and the shaft 24. In this manner the rotation of the blades 27 will also cause the fluid such as molasses to be thrown about in the horizontal leg 20, and the fluid discharged from the nozzle 33 will be moving or directed in the same direction as the flow of the ground material through the pipe member 19 at the junction between the vertical and horizontal legs thereof.

In the use and operation of this device where the connecting pipe between the grinder 10 and the collector 13 is in the form of an L, the pipe member 19 is constructed as an elbow or L-shaped member and is interposed at the junction between the pipe 12 and the pipe 15. The blower 16 will force the ground material upwardly through the pipe 12 and at this time the mixing member comprising the blades 27 will be rotated with the shaft 24. The speed of rotation of the shaft 24 may be regulated in any suitable manner so that the desired mixing of the ground material with the fluid may be effected. Co-active with the rotation of the mixing member comprising the shaft 24 and the blades 27, the molasses or fluid will be discharged from the nozzle 33 upwardly toward the central portion of the blade structure 27.

These blades 27 are so constructed as not only to whirl the ground material about the horizontal leg 20, but also to assist in the forward movement of the ground material so that the blower 16 will not have to assume the entire load of the mixed material as is the case at present. The molasses is discharged in the same direction as the flow of the material through the horizontal leg 20 of the pipe 19 and in this manner the discharge of the fluid will assist rather than retard the flow of the ground material.

This device has been put in actual operation and has been found to substantially entirely eliminate the present difficulties which are encountered by reason of the sticking of the ground material in the pipe connection between the grinder and the collector. In the event the material should for any reason collect in the horizontal pipe 15, between the mixing device and the collector 13, it is only a relatively small matter to disconnect the pipe member 19 from the pipes 12 and 15 and then force a rod into the pipe 15 so as to unclog the pipe. This procedure can be performed in a relatively short time without disconnecting any of the remaining machinery, but as a matter of practice it has been found that this mixing member will eliminate practically all of the difficulties encountered through the clogging of the connecting pipe.

What we claim is:

1. In a mixing structure for interposition between and for communication with a conducting means leading from a grinder and a blower and a conducting means leading to a collector, said structure comprising an upstanding tubular element of angular contour formed of a vertically disposed lower leg adapted for communication at its lower end with the conducting means leading from the grinder and the blower and a horizontally disposed upper leg opening at its rear end into the upper end of the vertical leg and adapted to have its forward end communicate with the conducting means leading to the collector, a horizontal shaft revolubly supported by and extending into said upper leg, a plurality of blades within said upper legs connected intermediate their ends to, disposed lengthwise of and bodily revolving with said shaft and each including a forward and a rear mixer, and a fluid discharge nozzle extending into said element at the point of mergence of said legs and being so disposed for directing the fluid upon said shaft and blades rearwardly of the forward mixers.

2. In a mixing structure for interposition between and for communication with a conducting means leading from a grinder and a blower and a conducting means leading to a collector, said structure comprising an upstanding tubular element of angular contour formed of a vertically disposed lower leg adapted for communication at its lower end with the conducting means leading from the grinder and the blower and a horizontally disposed upper leg opening at its rear end into the upper end of the vertical leg and adapted to have its forward end communicate with the conducting means leading to the collector, a horizontal shaft revoluble supported by and extending into said upper leg, a plurality of blades within said upper leg connected intermediate their ends to, disposed lengthwise of and bodily revolving with said shaft and each including a forward and a rear mixer, and a fluid discharge nozzle extending into said element at the point of mergence of said legs and being so disposed for directing the fluid upon said shaft and blades rearwardly of the forward mixers, said mixers being disposed in spaced relation with respect to said shaft.

3. In a mixing structure for interposition between and for communication with a conducting means leading from a grinder and a blower and a conducting means leading to a collector, said structure comprising an upstanding tubular element of angular contour formed of a vertically disposed lower leg adapted for communication at its lower end with the conducting means leading from the grinder and the blower and a horizontally disposed upper leg opening at its rear end into the upper end of the vertical leg and adapted to have its forward end communicate with the conducting means leading to the collector, a horizontal shaft revolubly supported by and extending into said upper leg, a plurality of blades within said upper leg connected intermediate their ends to, disposed lengthwise of and bodily revolving with said shaft and each including a forward and a rear mixer, a fluid discharge nozzle extending into said element at the point of mergence of said legs and being so disposed for directing the fluid upon said shaft and blades rearwardly of the forward mixers, said rear mixers being substantially disposed in spiral spaced relation with respect to a portion of said shaft, and said forward mixers being extended from the forward end of said shaft in proximity to the inner face of said upper leg and projecting beyond the forward end of the said upper leg for extension into the conducting means leading to the collector.

CLAUDE W. ENSOR.
PETER LEWIS BUBB.